United States Patent
Schmidt et al.

(10) Patent No.: US 10,579,494 B2
(45) Date of Patent: Mar. 3, 2020

(54) METHODS AND SYSTEMS FOR MACHINE-LEARNING-BASED RESOURCE PREDICTION FOR RESOURCE ALLOCATION AND ANOMALY DETECTION

(71) Applicant: NEC Laboratories Europe GmbH, Heidelberg (DE)

(72) Inventors: Florian Schmidt, Dossenheim (DE); Mathias Niepert, Heidelberg (DE); Felipe Huici, Dossenheim (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/133,749

(22) Filed: Sep. 18, 2018

(65) Prior Publication Data
US 2019/0213099 A1    Jul. 11, 2019

Related U.S. Application Data

(60) Provisional application No. 62/613,805, filed on Jan. 5, 2018.

(51) Int. Cl.
| | |
|---|---|
| *G06F 9/50* | (2006.01) |
| *G06F 11/34* | (2006.01) |
| *G06N 3/08* | (2006.01) |
| *G06N 5/04* | (2006.01) |
| *G06N 20/00* | (2019.01) |
| *G06F 11/30* | (2006.01) |

(52) U.S. Cl.
CPC .......... *G06F 11/3442* (2013.01); *G06F 9/50* (2013.01); *G06F 11/3006* (2013.01); *G06F 11/3452* (2013.01); *G06N 3/08* (2013.01); *G06N 5/046* (2013.01); *G06N 20/00* (2019.01)

(58) Field of Classification Search
CPC ......................................................... G06F 9/50
See application file for complete search history.

(56) References Cited

U.S. PATENT DOCUMENTS

| | | | |
|---|---|---|---|
| 2010/0083047 A1* | 4/2010 | Calinoiu | G06F 11/0778 714/38.11 |
| 2017/0032120 A1* | 2/2017 | Tolpin | G06F 21/53 |
| 2019/0205745 A1* | 7/2019 | Sridharan | G06N 3/04 |

OTHER PUBLICATIONS

Tomas Mikolov, et al., "Distributed Representations of Words and Phrases and their Compositionality", arXiv:1310.4546, Oct. 16, 2013, pp. 1-9.

* cited by examiner

*Primary Examiner* — Charlie Sun
(74) *Attorney, Agent, or Firm* — Leydig, Voit & Mayer, Ltd.

(57) ABSTRACT

A method for monitoring resources in a computing system having system information includes transforming, via representation learning, variable-size information into fixed-size information, and creating a machine learning neural network model and training it the machine learning model to predict future resource usage of an application. The method further includes providing the prediction of further resources usage of the application as an input to an action component, wherein the action component is one of an anomaly detector or a reinforcement learner that drives a scheduler. The method additionally includes performing, by the action component, at least one of scheduling resources within the computing system or detecting a resources usage anomaly.

12 Claims, 6 Drawing Sheets

METHODS AND SYSTEMS FOR MACHINE-LEARNING-BASED RESOURCE PREDICTION FOR RESOURCE ALLOCATION AND ANOMALY DETECTION

CROSS-REFERENCE TO PRIOR APPLICATION

Priority is claimed to U.S. patent application Ser. No. 62/613,805, filed on Jan. 5, 2018, the entire disclosure of which is hereby incorporated by reference herein.

FIELD

The invention relates to allocation of resources in a cloud computing or system computing environment.

STATEMENT OF FUNDING

The work leading to this invention has received funding from the European Union's Horizon 2020 research and innovation programme under grant agreement No 761592.

BACKGROUND

Predicting how many resources an application running inside a computer system will use at some point in the future has been a fundamental problem since the earliest stages of operating computers. In order to predict future resource usage, a model of a computer system can be created. Future resource usage information is especially important to schedulers, that is, the management parts of operating or orchestration systems that decide which applications to run and at which time and with which of the available, limited resources.

State of the art approaches to predicting future resource usage often use simple heuristics for predicting the future resources usage of an application. However, these heuristics use only very limited information and decision-making processes. Furthermore, such heuristics are typically a one-size-fits-all solution designed under worst-case assumptions so as to be applicable in a wide range of applications and systems environments.

SUMMARY

In an embodiment, the present invention provides a method for monitoring resources in a computing system having system information. The method includes transforming, via representation learning, variable-size information into fixed-size information, and creating a machine learning neural network model and training it the machine learning model to predict future resource usage of an application. The method further includes providing the prediction of further resources usage of the application as an input to an action component, wherein the action component is one of an anomaly detector or a reinforcement learner that drives a scheduler. The method additionally includes performing, by the action component, at least one of scheduling resources within the computing system or detecting a resources usage anomaly.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
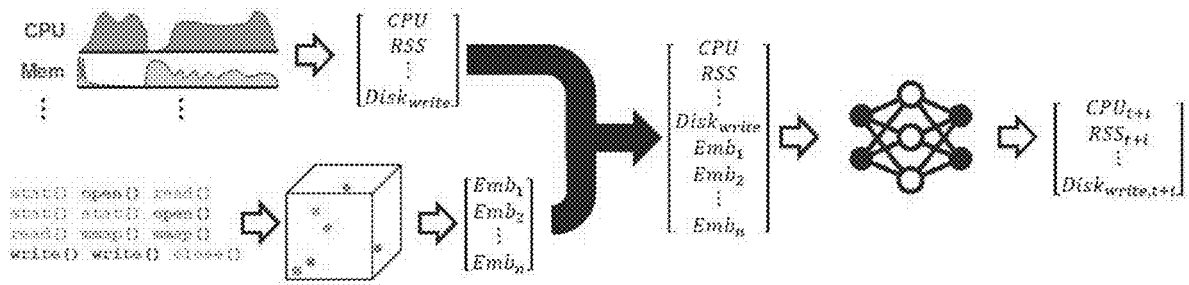
FIG. 1 depicts the correlation and combination of data pertaining to the load on hardware resources, e.g. CPU, memory, and I/O resources, and system event data.

Embodiments of the present invention provide methods and systems for predicting future resource usage of a computer system over time. Embodiments of the present invention create machine learning models that provide, based on past resource usage and past behavior of the computer system and applications being executed thereon, improved predictions of future resource usage of the computer system. Moreover, embodiments of the present invention can utilize predicted future resource usage to detect anomalies (e.g., by comparing the predicted resource usage for a particular period of time to the actual resource usage measured during such time period) and to perform resource allocation within the computer system in a manner that improves runtime behaviour and resource usage efficiency. In addition, embodiments of the present invention utilize reinforcement-learning-based feedback approaches that monitor outcomes of resource allocation decisions in order to fine-tune resource allocation decision making.

Embodiments of the invention can provide for a number of improvements in the operation of cloud computing systems and other computing systems that share computing resources. Specifically, by creating models that take into account system and application behaviour and by utilizing data related to such behaviour in those models, e.g. learned representations of system events, embodiments of the invention can predict—both more accurately and earlier than prior art systems and methods—future system-wide and application-specific resource usage. As a result, embodiments of the present invention can allocate resources in cloud computing or system computing environments with less uncertainty, and hence, higher efficiency than prior art system and methods. This enables embodiments of the invention to reduce the amount of wasted resources in such cloud computing or system computing environments and to reduce the amount of power required to operate such computing environments. Furthermore, by making more accurate predictions of future system-wide and application-specific resource usage, embodiments of the present invention are able to eliminate or reduce instances in which services run out of resources as a result of poor resource allocation decisions resulting from underestimation of resource usage. In addition, embodiments of the invention can also detect anomalous behaviour of applications and thereby trigger interventions to resolve any issues that such anomalous behaviour is indicative of. Therefore, embodiments of the invention can reduce both the costs and environmental impacts of operating large scale cloud and system computing environments while simultaneously achieving improved overall performance.

Embodiments of the invention provide systems and methods for tracing system events, e.g. system calls and/or library calls, in order to generate data that can be provided as input to a model for predicting future compute and/or memory resource usage in a computing system. A system call is a special function executed by an operating system on behalf of an application. This is necessary to execute functionality from an application that requires privileged access that only the operating system has, such as file access (reading/writing) or requesting additional memory. Operating systems provide different ways to execute such system calls (via software interrupts or special CPU instructions), but they share the behavior that an application initiates such a call. Once a system call is made, the requested task will be run by the operating system on behalf of the application, after which results will be passed back to the application. A library call is a call to any function that is not part of an application itself, but rather of a separate loaded library. In the case of the standard libraries provided by an operating system or programming library languages, these provide well-known, well-documented, and well-standardized functionality. Therefore, library calls provides a potentially large, but limited amount, of well-defined functionalities—calls to which can be recorded.

Embodiments of the invention provide systems and methods for representing variable-length sequences of system events into fixed-size representations. Specifically, raw data that consists of a sequence of calls (i.e. system calls and/or library calls) made by an application and time-stamps indicating the time at which each call occurred can be divided into a number of shorter sequences that each correspond to a particular time interval and each shorter sequence can then be transformed into a fixed-size representation. Such particular time intervals can be selected so as to correspond to regular intervals at which traditional usage statistics, such as CPU usage and memory usage, are measured.

Embodiments of the invention provide systems and methods for integrating fixed-size representations of system events with traditional usage statistics in order to predict future compute and/or memory resource usage in a computing system. For example, systems and methods can provide integrated representations and usage statistics as input to a neural network for generating predictions regarding future resource usage. The neural network can be, e.g., a neural network with an internal state, such as a long short-term memory (LSTM).

Embodiments of the present invention can be employed in a variety of resource allocators, e.g. process schedulers in operating systems and orchestrators in computing clusters.

According to an embodiment of the invention, a method is provided for monitoring resources in a computing system having system information. The method includes transforming, via representation learning, variable-size information into fixed-size information, creating a machine learning neural network model and training it the machine learning model to predict future resource usage of an application, and providing the prediction of further resources usage of the application as an input to an action component, wherein the action component is one of an anomaly detector or a reinforcement learner that drives a scheduler. The method further includes performing, by the action component, at least one of scheduling resources within the computing system or detecting a resources usage anomaly. The machine learning model can be a neural network model. The system information can include at least one of CPU usage, memory usage, and system calls. The system information can include resource usage statistics of one or more resources in the computing system and can further include raw system call data. The raw system call data can include a sequence of system calls and, for each respective system call in the sequence, a time stamp indicting a time at which the respective system call was made. The sequence of system calls can be divided into a plurality of time interval system call sequences, each time interval system call sequence including system calls corresponding to a particular time interval. The particular time interval can correspond to a time interval at which the resource usage statistics of the one or more resources in the computing system are measured. The transforming variable-size information into fixed-size information can include transforming each time interval system call sequence into a fixed-dimension vector representation. At least one of a one-hot encoding or a count hot encoding can be used to transform each of the plurality of time interval system call sequence into a fixed-dimension vector representation. Alternatively, representation learning can be used to transform each of the plurality of time interval system call sequence into a fixed-dimension vector representation.

Training the machine learning model to predict future resource usage of the application can include providing the fixed-dimension vector representations to the machine learning model as an input. Training the machine learning model to predict future resource usage of the application can further include providing, for each particular time interval, a resource usage vector including a number of dimensions corresponding to a number of metrics in the resource usage statistics of the one or more resources in the computing system. Elements of each resource usage vector can include numerical values corresponding to measured values of the metrics in the resources usage statistics.

According to an embodiment of the invention, a system is provided for monitoring resources in a computing system. The system includes memory resources configured to store data and compute resources including one or more processors. The processors are configured to transform variable-size information into fixed-size information, create a machine learning model and train the machine learning model to predict future resource usage of an application, provide the prediction of further resources usage of the application as an input to an action component, wherein the action component is one of an anomaly detector or a reinforcement learner that drives a scheduler, and perform at least one of scheduling resources within the computing system or detecting a resource usage anomaly.

According to an embodiment of the invention, a non-transitory computer readable medium is provided having stored thereon computer executable instructions for performing a method for monitoring resources in a computing system having system information. The method includes transforming variable-size information into fixed-size information, creating a machine learning model and training the machine learning model to predict future resource usage of an application, and providing the prediction of further resources usage of the application as an input to an action component, wherein the action component is one of an anomaly detector or a reinforcement learner that drives a scheduler. The method further includes performing, by the action component, at least one of scheduling resources within the computing system or detecting a resource usage anomaly.

According to embodiments of the invention, systems and methods for predicting future application resource usage information extract information pertaining to resource usage, i.e. traditional usage statistics. The traditional usage statistics can include current overall CPU and memory usage (i.e. the aggregate CPU and memory usage of all applications and system processes), an average of overall CPU and memory usage over a sliding window of several seconds or minutes, etc. System-wide resource usage information generally provides little insight into resource usage on a per-application basis. Application-specific resource usage information can be of the same type as the system-wide resource usage information but on a per-application basis. For example, application-specific resource usage information can include current CPU and memory resources used by individual applications and an average over a sliding window of CPU and memory resources used by individual applications. The system-wide resource usage and the resource usage of individual applications, e.g. current CPU utilization, memory usage, and/or I/O operations, can be requested from an operating system. CPU usage can be measured on a user/system, per-process, or aggregated basis. Memory usage can be measured on a virtual memory and current resident set, per-process or aggregated basis. Disk I/O can be measured in an amount of data or a number of requests, reading or writing, per-process or aggregated. Network I/O can be measured in the same fashion. CPU performance counters (special information produced by the CPU hardware about details such as cache misses, instructions per cycle, etc.) can also be accounted for. Requests for such information can be made, for example, by a monitoring application running on the same system as the applications that are being monitored and for which predictions are to be made. The monitoring application can run as a privileged application (one having root access). Information pertaining to current application resource usage can be collected through various telemetry methods. For example, in Linux, such information can be received from /proc/<pid>/stat for single processes, or from /sys/fs/cgroup/<resourcetype>/<cgroupname>/for process groups running as a control group (a "cgroup").

A cgroup is an operating system primitive that allows monitoring and limited resource usage of a group of processes. It can be created by a user or application with elevated (root) rights, and subsequently, processes can be started within such a cgroup. Processes started within the cgroup (i.e. "child processes") automatically inherit the cgroup and generally cannot leave the cgroup. Thus, all processes spawned by an application belong to a cgroup, and the aggregated resource usage of those processes is the resource usage of the cgroup, which can be queried in a way very similar to the/proc/<pid>/stat way above.

Typically, an operating system provides such general resource usage information on a per-process basis. However, as applications very frequently comprise multiple (and potentially large numbers of) processes, information pertaining to resource usage of individual processes belonging to an application must be aggregated in order to provide information pertaining to resource usage on a per-application level. For example, general resource usage information is easily available but accounted for on a per-process basis on Unix-like systems. This is useful for process scheduling, but for more coarse-grained scheduling of jobs or services that include several processes run in sequence or in parallel, aggregate measurements are required. In order to provide aggregate measurements, a process group including all processes spawned by one initial process (i.e. all process that do not specifically request to leave the group) can be formed and measurements can be performed and recorded for the entire process group as well as for its individual component processes. In Linux, for example, a parent process that initiates the spawning of children processes and keeps a list of such children (which can help in the cleanup of crashed processes, for example). Each child process inherits the process group ID from its parent, such that all processes that are spawned by another process share a group ID.

A process can request to leave its parent's process group by a special system call. Since process group provides a logical concept of a group of processes belonging to a certain application/task, requests to leave a process group often result when a program spawns parts that do not belong to the original application any more. One example would be starting a server, because a server application will be a stand-alone piece that will want its own group ID.

Aggregation can be slightly cumbersome because there is no easy way to look up all processes belonging to a group given the group ID. Instead, a request must be sent to each respective individual process that asks the respective process to provide the identity of the process group to which it belongs. This, and the resource information, can be collected by reading it from an interface that the operating system provides to users and applications with elevated (root) rights to request information about the runtime behavior of processes (identified by their process ID), e.g. /proc/<pid>/stat. Alternatively, a new cgroup can be created and the initial process spawned into it. The resource requirements of the process group are then the resources used by the cgroup.

Requests for a process group ID can be sent to individual processes at specific measurement intervals or can be triggered by other actions. The specific measurement intervals can correspond to regular intervals at which traditional usage statistics, such as CPU usage and memory usage, are measured. In order to limit the resources utilized by the sending and processing of such requests, caching can be employed. Such caching could, for example, be based on the assumption all processes (identified by their process IDs) that one has seen before and that did not belong to the process group one is interested in, still do not belong to the process group. This can be a reasonable assumption (because processes very rarely change their group after initial setup). However, process IDs can be reissued (if a process ends a new one needs to be created), so such caching would need to carefully consider the behavior of the specific operating system configuration in that regard.

In addition to monitoring the above mentioned standard application resource usage information, embodiments of the present invention further measure what each process is doing at runtime. Therefore, in addition to acquiring the foregoing high-level usage statistics, embodiments of the present invention also inspect program behaviour. In order to provide routines that are generic for all applications and the do not require additional, application-specific information, embodiments of the present invention trace and analyze the system calls that a program performs in order to provide a rough understanding of what a process is doing. Information pertaining to the system calls that a program performs is always available because it does not rely on code annotation or other symbols. Therefore, because the input information pertaining to application behaviour utilized by the embodiments of the present invention is generic across all or a wide variety of applications, embodiments of the invention do not rely on information that is only available for some applications, e.g. domain-specific knowledge regarding input data or introspection support that needs changes to an application binary. However, according to embodiments of the invention, information pertaining to the internal behaviour of applications could be used in addition to the system events that can be traced as described herein.

System calls can be easily traced using tools that record the executing of certain code pieces, typically by hooking into an interface and intercepting those calls, passing them on to their original destination after recording them, e.g. tracers. Such tools are typically applications that run on the same system as the applications they are used to monitor. For example, strace is a standard tool available on Unix-like systems and has low overhead (it increases the runtime of applications by only a few percent when a moderately high number of system calls occurs, to virtually zero percent when there are no system calls happening). In case of workloads with extremely high numbers of system calls, perf, a highly efficient tool for tracing information in Linux, can be used to sample system calls instead of tracing every single one, further reducing the overhead. Conversely, if a higher level of detail is required, ltrace, a tool that allows the interception and recording of calls to standard libraries, can be used instead to catch all library interactions.

According to embodiments of the invention, systems and methods for predicting future application resource usage information discretize the information pertaining to current resource usage and the information pertaining to the behavior of applications in order to provide such information in a format suitable for a machine-learning system, i.e. provide such information in a fixed-format manner. The discretization is done by partitioning the time during which such information was obtained into discrete measurement intervals. Information pertaining to current resource usage, such as CPU utilization, is naturally represented as a metric over time and thus does not need any novel form of representation. For example, measurements of current resource usage can either be snapshots, i.e. usage at a particular point in time at which measurements are taken (e.g. memory usage shows usage at a particular point in time at which the measurement was taken), or can take a measurement interval into account (CPU usage is measured in the time the CPU was used, e.g., CPU-nanoseconds, and the usage in the last measurement interval can be derived by subtracting the new measurement value from the previous one). Current resource usage information can be provided as a fixed-dimension vector having length equal to a number of resource usage metrics that are monitored. The value of each element of such a vector is equal to the measured value of a corresponding usage metric.

Information pertaining to the behavior of applications, as represented by system or library calls, however, does not naturally lend itself to representation in a discrete and fixed-format manner because (i) the number of calls per time unit varies greatly, and (ii) the number of different possible calls can also be very high. Furthermore, system calls occur at (seemingly) random times and are discrete events as opposed to continuous numerical values. Within a time period of a second, thousands of system calls, or none at all, can occur. In order to represent the behaviour of an application in a discrete and fixed-format manner, two different approaches can be considered. If the number of possible different calls is low, data pertaining to the application's behaviour can be represented by a counting vector that counts the number of occurrences of each call during a pre-determined time period. Such pre-determined time period can be linked to time periods during which process resource usage metrics are measured. For example, the pre-determined time period during which the number of occurrences of each call are measured can be equal to the interval at which requests for group IDs are sent to individual processes or some multiple thereof. If the number of possible different calls is higher than a threshold, an intermediate step employing representation learning is used. The representation learning utilized by embodiments of the invention involves techniques similar to those previously used in the field of natural language processing (NLP). For example, techniques can be used that are similar to those described by Mikolov et al. (Tomas Mikolov, Ilya Sutskever, Kai Chen, Greg S Corrado, and Jeff Dean. 2013. Distributed representations of words and phrases and their compositionality. In *Advances in neural information processing systems*. 3111-3119). Each of the two different approaches (i.e. representing data pertaining to an application's behaviour by a counting vector or representing data pertaining to an application's behaviour by vectors generated through representation learning techniques) provides a fixed-format representation of the extracted information.

In order to obtain raw system call data, i.e. collect a corpus of system call sequences, strace can be run on the various types of applications run on the system under consideration. The system call sequence data can then be used to learn system call embeddings through a model similar to the skip-gram model. As a result, all system calls occurring within a time period can be interpreted as a "sentence" and then used to create a fixed-dimension vector representation. The resulting fixed-dimension representation of the system call sequence can then directly be used to train a machine learning systems model. In order to transform an individual sequence of calls (which, e.g. corresponds to a particular time interval), into a fixed-dimension vector, one of two potential approaches can be utilized. The specifics of a particular setup determine which approach is superior.

According to a first approach, a "one-hot" encoding is performed. In such an approach, each call is assigned a number, and an n-vector of zeros is created. For each call occurring in a time interval, the assigned call number k is looked up, and the value v[k] is incremented. In addition to "one-hot" encoding, in which the value v[k] will be set to the number of times the call with assigned call number k was made during the measurement interval, "count hot" encoding, in which the value v[k] is set to 1 regardless of whether there are one or several occurrences of the call with assigned call number k during the measurement interval, can also be used. The advantage is the simplicity (conceptually and computationally) of this approach. However, it means that for each possible call, the vector needs a dimension. In the case of syscalls, this already leads to a vector of more than 300 entries, corresponding to the 300+ possible system calls. While this is still somewhat manageable, the same approach breaks down for library calls, of which there are many more.

According to the second approach, representation learning is used. Representation learning can be performed using the well-known word2vec implementation of gensim

[https://radimrehurek.com/gensim/models/word2vec.html] for this task. word2vec's creates a fixed-size vector representation of a variable length of input features (in our case, the calls that occurred during a particular measurement interval) which encodes information about the sequence, effectively using word2vec as a sophisticated compression tool that provides a fixed-size output for variable-size input.

Embodiments of the invention provide systems and methods for predicting future application resource usage information that include machine-learning based analysis and prediction. Having created the fixed-dimension representations of telemetry data and of application system calls, such representations can be supplied as an input to a machine learning algorithm, specifically a neural network (which requires fixed-dimension input data). This machine learning algorithm creates a model that can predict, for a computing system or for an application, a resource usage at a certain time in the future. In the end, all systems are state-based and, given a current state, the model of the computing system or application can be used to make predictions about the future behaviour of said computing system or application. In many cases, prior values of resource usage will have at least some influence on current resource usage. For example, memory consumption will often increase or decrease gradually over time. CPU usage typically exhibits greater variation, although for many processes phases of low activity and high activity will be apparent.

According to one or more embodiments of the invention, the machine learning algorithm can be represented by the following pseudo code:

```
align_data_and_create_vector:
    calls = take all calls that occurred in the previous measurement time
        window
    if (use_word2vec)
        cv = word2vec(calls)
    else { /* count hot */
        cv = zero-filled vector of size(number of syscall types)
        for each call:
            cv[number assigned to call]++
    }
    v = all other measurements, in a fixed predefined order
    return (append(v, cv))
/* pre training phase: */
collect initial data (resource usage, call information)
if (use_word2vec)
    word2vec_create_corpus(call information) /* all call information as
        recorded */
/* initial training phase: */
do:
    for each time window:
        v = align_data_and_create_vector(resource_usage,
            call_information)
        model_train(v, future_resource_usage)
while model_loss > target_loss AND model_loss is still decreasing
/* prediction phase: continuously collect data and predict future resource
usage */
in each time slot:
    collect resource_usage, call_information
    /* continuous training */
    v = align_data_and_create_vector(last_resource_usage,
        last_call_information)
    model_train(v, resource_usage)
    /* resource usage prediction */
    v = align_data_and_create_vector(resource_usage,
        call_information)
    p = model_predict(v)
    /* multiple options now. */
    /* Example 1: anomaly detection */
    if abs(last_resource_usage − last_p) > epsilon:
        raise alarm or terminate application
    /* Example 2: (naive) resource allocation */
    from available machines:
        find machine with least free resource that satisfies p
    /* save values for next round */
    last_resource_usage = resource_usage
    last_call_information = call_information
    last_p = p
```

Several recent neural network based machine learning architectures can maintain some sort of internal state. Examples are recurrent networks such as LSTMs and variants, memory networks, and neural Turing machines, to name but a few. Such methods can be employed to provide a system model that maintains a vector (hidden) representation of a current state of the system and is trained so as to minimize the expected error (i.e. the root-mean-square error (RMSE)) of predicting future resource usage. To provide a simple model for the use case of resource usage prediction, an LSTM can be trained with collected and preprocessed data that includes past usage statistics and past system call data. The learning of system call embeddings can be performed as a preprocessing step or within an end-to-end architecture.

Embodiments of the invention provide systems and methods for predicting future application resource usage information that include performing prediction-based actions. A resource allocator can act on the predicted future resource usage in order to allocate resources in a computing system. According to a first set of embodiments, at each point t, resource usage at point t+i is predicted, and if when reaching t+i, the actual resource usage significantly diverges from the prediction, an anomaly is detected and corrective action is taken in response. Corrective action can include, e.g., notifying maintenance personnel, enacting automatic countermeasures such as limiting the resources available to an application, moving it to a different environment (e.g., quarantining the application), or automatic emergency shutdown of the application. According to a second set of embodiments, at each point t, the resource allocator plans the allocation of resources to applications at the point t+i. Instead of prior art allocators (e.g., cluster schedulers or process schedulers in operating systems), which use simple heuristics to roughly predict future resource usage, resource allocators according to embodiments of the invention can utilize the foregoing predictive models to provide improved predictions of future resource usage and thereby improve resource allocation. Optionally, the resource allocation decision can be fed back into the model as additional input, thereby allowing the system to utilize reinforcement learning in order to further improve future allocation decisions.

FIG. 1 depicts the correlation and combination of data pertaining to the load on hardware resources, e.g. CPU, memory, and I/O resources, and program behaviour, as evidenced by the system calls made by an application over a time period t. The variable number of calls is transformed into a fixed-dimension vector via a word embedding. The two vectors are combined and used as input for a machine learning model, e.g. an LSTM, that then predicts the resource usage at some future time period t+i. It is notable that some system calls have an obvious relationship with certain types of resources. For example, write, read, and similar system calls work on files or sockets, which translates into disk or network I/O. The relationship between such system calls and I/O is obvious. However, even for CPU usage, there is a strong relationship: for example, disk I/O often correlates with low CPU usage since the process is waiting on I/O accesses to the finished.

Figure 2:
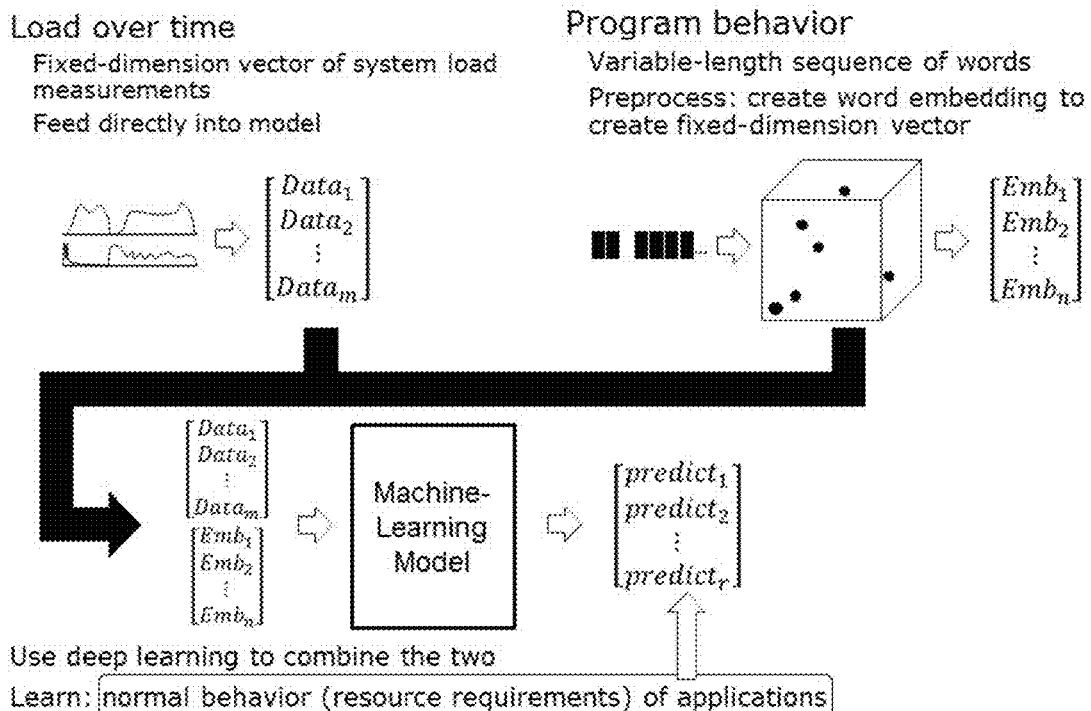
FIG. 2 depicts the use of a model developed with deep learning techniques for predicting resource requirements of applications from a combination of data pertaining to load over time on physical resources and data pertaining to system events.

FIG. 2 depicts the use of a model developed with deep learning for predicting resource requirements of applications from a combination of data pertaining to load over time on physical resources and data pertaining to system events. The data pertaining to load over time on physical resources includes a fixed-dimension vector of system load measurements. Each component of the fixed-dimension vector is a measurement of resource usage during a pre-determined time period, e.g. CPU usage, memory resource usage, disk I/O data, network I/O data, and CPU performance counter data measured during the pre-determined time period. The measurements of resource usage included as individual components of the fixed-dimension vector can be provided on a per-process or a per-application basis. Therefore, measuring resource usage does not necessarily require that the aggregate resource usage attributable to a particular application be generated as a sum of the resource usage attributable to each process thereof and that all the constituent resource usage values of individual processes are discarded. Instead, each resource usage measurement for each process can be individually represented in the fixed-dimension vector of system load measurements. The pre-determined time period can, e.g., be equal to the interval at which requests for group IDs are sent to individual processes by a monitoring application or some multiple thereof.

The data pertaining to system events in FIG. 2 is created through a representation learning process in which a fixed-dimension vector is created from system call data generated, e.g. by tracers, during a particular pre-determined time period. Specifically, a system event data set including all system calls (and optionally other system events) made during the pre-determined time period and the sequence in which they were made (and optionally the time intervals between consecutive system calls) is generated by one or more monitoring applications, e.g. tracers. Thereafter, the system event data set is discretized to generate a fixed-dimension vector representation of the system event data set for the particular pre-determined time period.

Thereafter, the fixed-dimension vector of system load measurements and the fixed-dimension vector representation of the system event data set are provided as input to a machine learning model that has previously been trained to generate resource usage predictions for each of one or more applications during a future time period. The machine learning model can, e.g., be trained in the manner described below in connection with FIG. 4. The machine learning model then provides, as output, resource usage predictions for each of one or more applications during a future time period.

Figure 3:
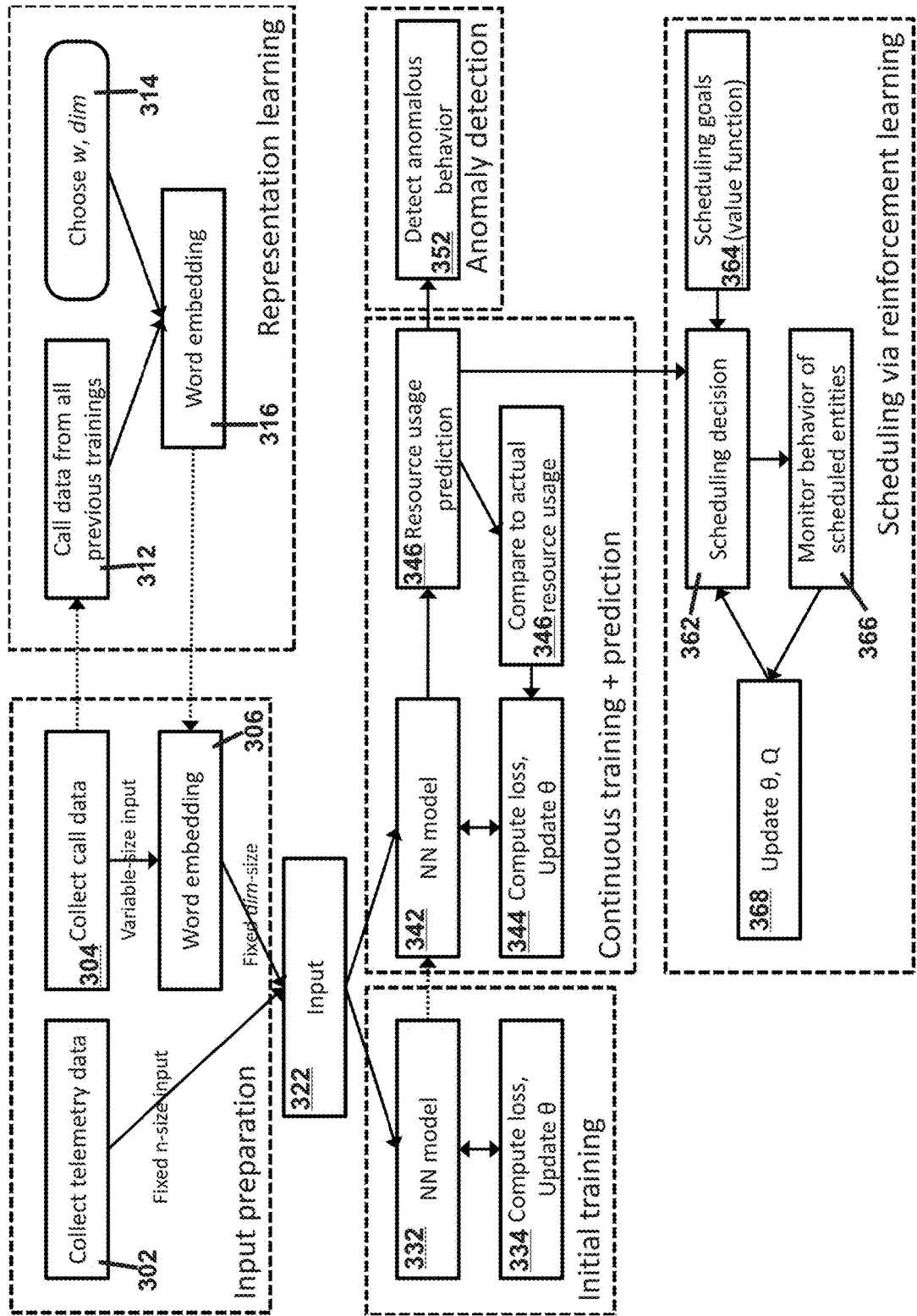
FIG. 3 depicts the flow of data in a process for using representation learning to generate fixed-dimension vector representations of system event data sets in order to perform neural network training, resource scheduling, and anomaly detection.

FIG. 3 depicts the flow of data in a process for using representation learning to generate fixed-dimension vector representations of system event data sets in order to perform neural network training, resource scheduling, and anomaly detection. At 302, telemetry data (i.e. current resource usage data) is collected. The telemetry data is provided as a first component of input 322. At 304, call data (i.e. raw system call data including a sequence of system calls and corresponding time stamps that indicate a time at which each system call was made) is collected. At 312, the collected call data is added to the corpus of call data from all previous trainings. At 314, values for a window size w (which chooses how much word context is taken into account by a representation learning model during training) and for an output dimension size dim are selected. At 316, representation learning is used to create a word embedding that is a fixed-dimension representation of the collected call data of dimension dim. The representation learning takes as input the corpus of call data, the window size w, and the output dimension size dim. The word embedding is then provided as 318 as a second component of input 322.

The input 322 is provided, during initial training, to a neural network model 332 and a loss is computed and model parameters θ are updated at 334. The input 322 is also provided, during a continuous training and prediction stage, to neural network model 342 and a loss is computed and model parameters θ are updated at 344. The neural network model is also used to perform resource usage prediction at 346. The resource usage predicted at 346 is used to detect anomalous behaviour at 352 and is also compared with actual resource usage at 348. Furthermore, the resource usage predicted at 346 is also used to perform scheduling of resources at 362. The scheduling of resources at 362 is performed so as to achieve scheduling goals defined at 364. Scheduling decisions are monitored at 366 and, based on the monitoring of the scheduling decisions, model parameters θ of the neural network and parameters Q of the scheduling goal value function can be updated.

Figure 4:
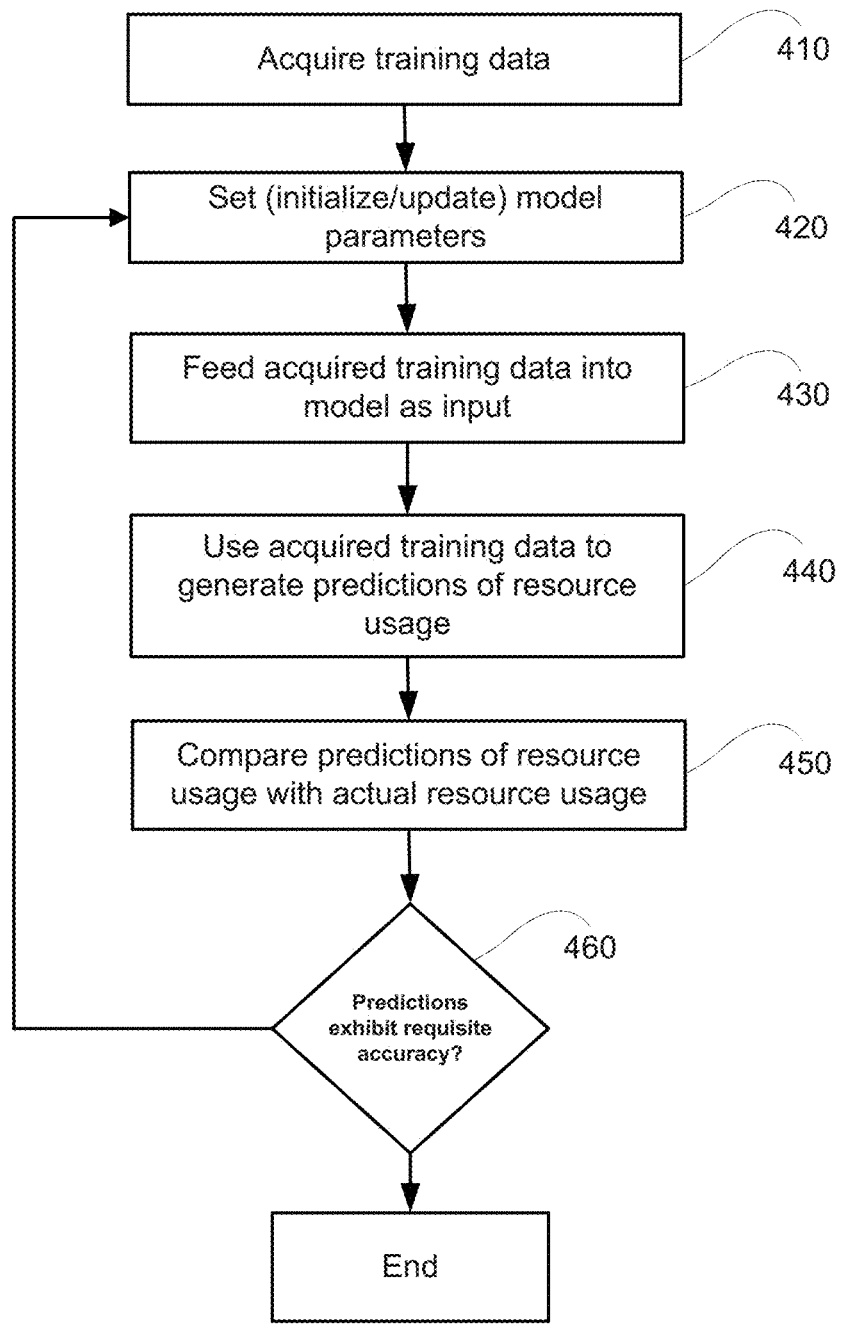
FIG. 4 illustrates a process for training a model for predicting future resource usage.

FIG. 4 illustrates a process for training a model for predicting future resource usage. At 410, the process acquired training data. The training data can be acquired, e.g., by recording for multiple time periods, data pertaining to load over time on physical resources and data pertaining to system events—as described above in connection with FIG. 2. At 420, the process initializes model parameters θ. Thereafter, at 430 the process feeds the acquired training data that corresponds to one or more first time periods into the model as input, and at 440, the model uses the acquired training data to generate predictions of resource usage for one or more second time periods (i.e. performs a forward pass). At 450, the process compares the predictions of resource usage for the one or more second time periods with actual resource usage measured during the one or more second time periods, and at 460 determines whether the predictions for resource usage generated at 440 have the requisite accuracy. If the requisite accuracy has been achieved, the process ends. If the requisite accuracy has not been achieved, the process proceeds to 470 where it updates the model parameters θ based on the comparisons performed at 450 in order to improve the accuracy of the predictions (i.e. performs a backward pass) and then returns to 430. While not strictly required, the initial training phase described in FIG. 4 is beneficial as predictions made by an untrained model are not likely to be particularly accurate.

Figure 5:
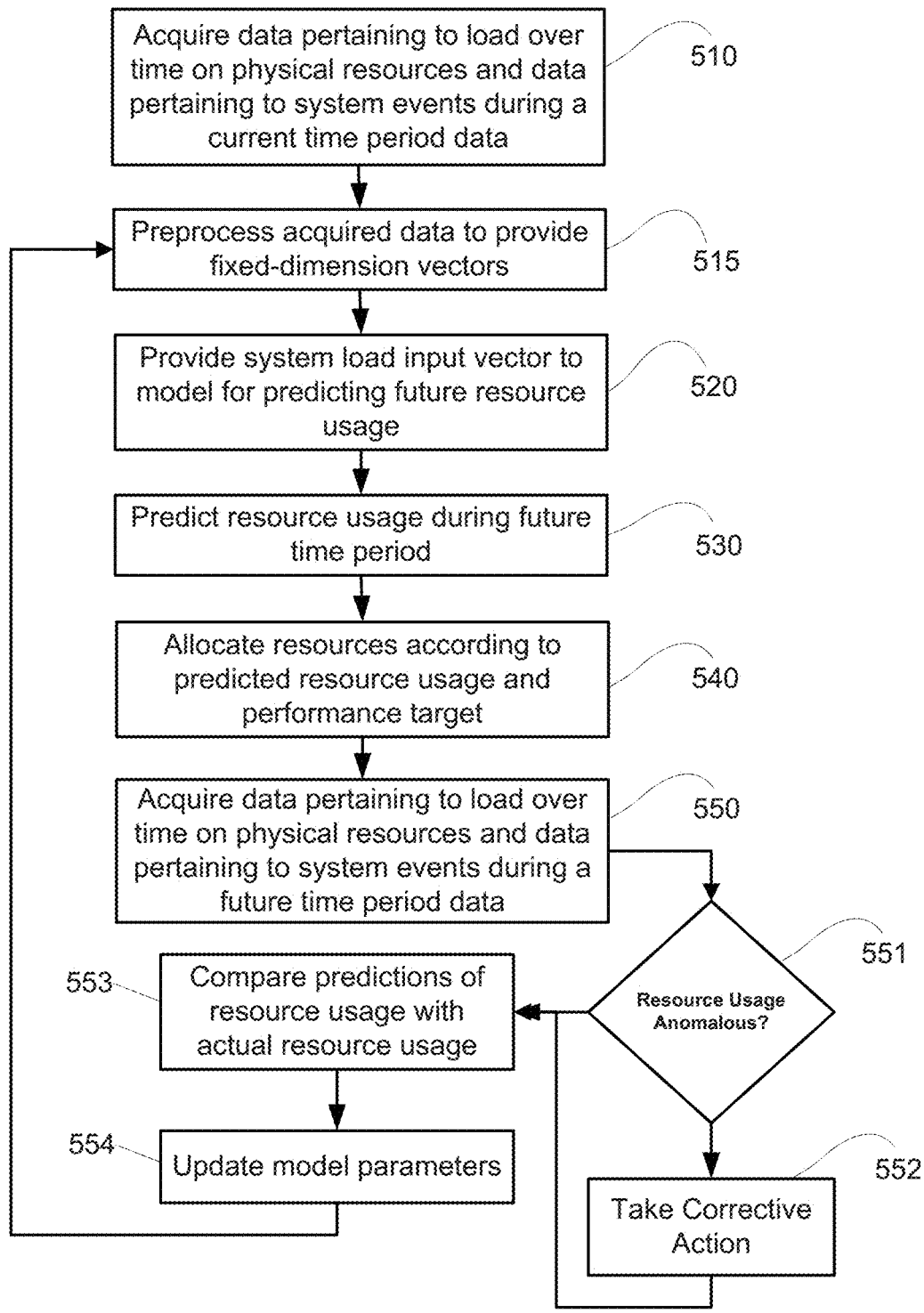
FIG. 5 illustrates a process for allocating resources and detecting anomalies in a computing system based on predictions of future resource usage by one or more applications.

FIG. 5 illustrates a process for allocating resources and detecting anomalies in a computing system based on predictions of future resource usage by one or more applications. At 510, the process acquires data pertaining to load over time on physical resources and data pertaining to system events during a current time period. At 515, the acquired data is preprocessed such that the data pertaining to load over time is formatted as a fixed-dimension vector of system load measurements where, as described in connection with FIG. 2, each component of the fixed-dimension vector is a measurement of resource usage during a pre-determined time period, e.g. CPU usage, memory resource usage, disk I/O data, network I/O data, and CPU performance counter data measured during the pre-determined time period t. The data pertaining to system events during the particular time period t is formatted as a fixed-dimension system event vector created from system call data generated during the time period t by using representation learning, e.g. as described in FIG. 3.

At 520, the fixed-dimension vector of system load measurements and the fixed-dimension system event vector are combined into a single system load input vector, and said system load input vector is provided to a model for predicting future resource usage, e.g. a model trained according to the process described in FIG. 4. At 530, the process uses the model for predicting future resource usage to predict resource usage for one or more application during a future time period. At 540, the process allocates resources within the computing system according to the resource usage predicted at 530 and so as to achieve a certain performance target, e.g. minimize average waiting time, provided by a value function having parameters Q. Allocating resources at 540 can be performed on a per-application basis as well as at other levels of granularity, e.g., on a per-process or per-virtual machine basis. At 550, the process acquires data pertaining to load over time on physical resources and data pertaining to system events during the future (but now current) time period. At 551, the process determines whether the resource usage of any application during the future time period is anomalous. Resource usage of an application can be determined to be anomalous if one or more system load measurements acquired at 550 deviate from corresponding system load measurements predicted at 530 by some anomaly threshold, e.g. a threshold magnitude or a threshold percentage difference. If anomalous behaviour is detected, corrective action is taken at 552. At 553, the process compares the system load measurements acquired at 550 and compares them to the system load measurements predicted at 530. At 554, the process updates parameters θ of the model used at 530 and the parameters Q of the value function used at 540 based on the comparisons performed at 553 in order to improve the accuracy of future predictions (i.e. performs a backward pass) and to improve future allocations. According to some embodiments, step 554 may only be performed if comparisons performed at 553 indicate that one or more of the predicted system load measurements (from 530) or some combination thereof differ from the actual system load measurements (from 550) by some threshold percentage or threshold magnitude. Thereafter, the process returns to 515 where the data acquired at 550 is formatted in the same manner as described for the data acquired at 510.

Figure 6:
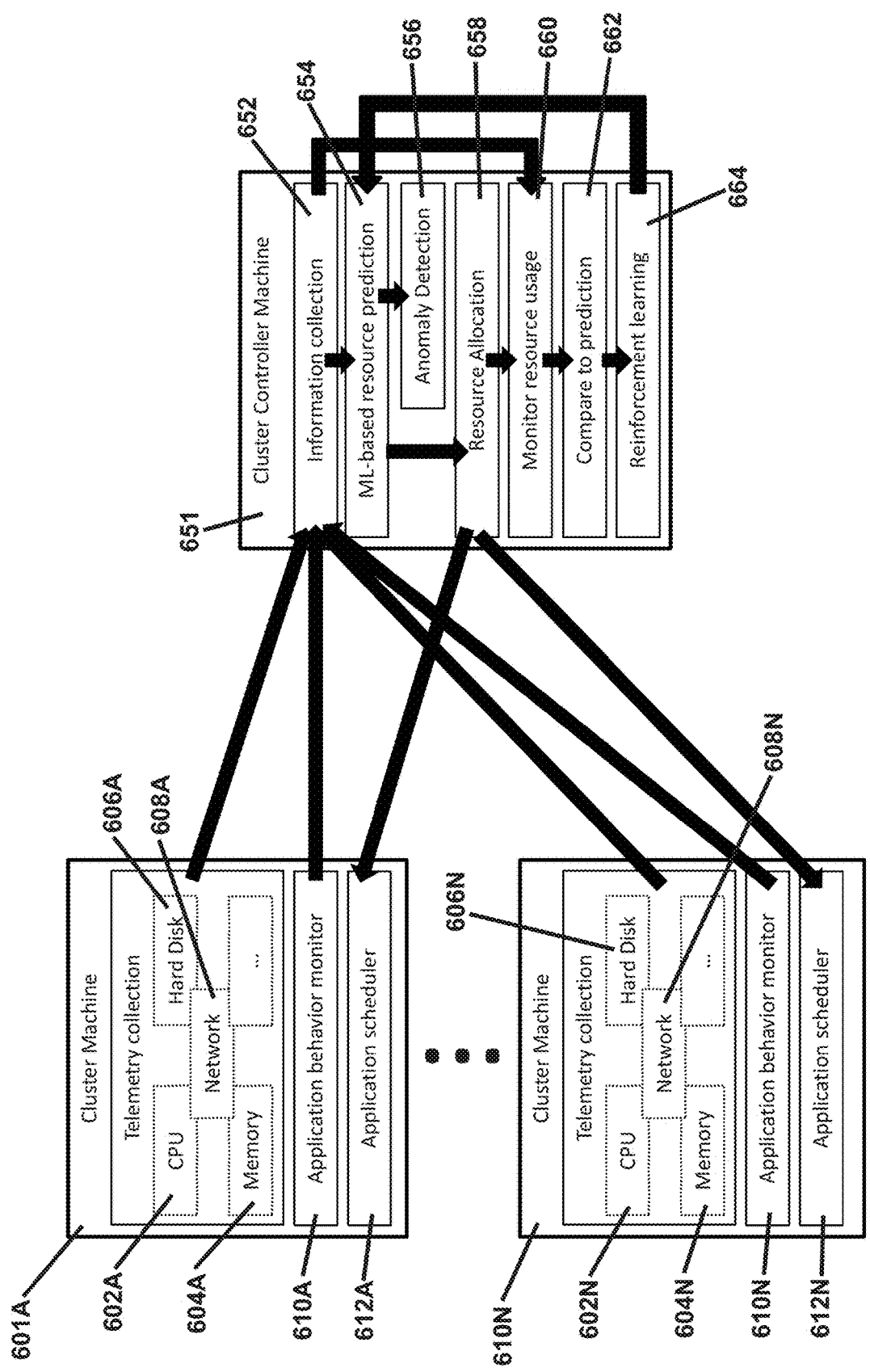
FIG. 6 depicts a system for using deep learning to predict resource requirements of applications from a combination of data pertaining to load over time on physical resources and data pertaining to application behaviour and for detecting anomalies.

FIG. 6 depicts a system for using deep learning to predict resource requirements of applications from a combination of data pertaining to load over time on physical resources and data pertaining to application behaviour and for detecting anomalies. The system depicted in FIG. 6 includes a first cluster machine 601A and an nth cluster machine 601N. Each of the cluster machines is a physical machine including compute resources, storage resources, and network resources. The compute resources of the physical machines include one or more processors each having one or more processor cores. The compute resources specifically include CPUs 602A and 602N. The storage resources can include computer readable memory, e.g., random-access-memory (RAM) and/or cache memory. The storage resources particularly include memories 604A and 604N and hard disks 606A and 606N. The network resources, i.e. network resources 608A and 608N, can include, e.g., a physical network interface controller. Furthermore, each of the first cluster machine 601A and the nth cluster machine 601N includes an application behaviour monitor (610A and 610N) and an application scheduler (612A and 612N). Each application behavior monitor and each application scheduler is a set of processor executable instructions stored at a processor readable memory, e.g. one of memories 604A and 604N, and configured to be executed by a processor, e.g. one of CPUs 602A and 602N.

The system depicted in FIG. 6 further includes a cluster controller machine 651. The cluster controller machine 651 is a physical machine including compute resources, storage resources, and network resources. The compute resources of the cluster controller machine 651 include one or more processors each having one or more processor cores. The storage resources of the cluster controller machine 651 can include computer readable memory, e.g., random-access-memory (RAM) and/or cache memory. The network resources of the cluster controller machine 651 can include, e.g., a physical network interface controller. The cluster controller machine 651 further includes information collector 652 configured to perform information collection, machine-learning based resource predictor 654 configured to predict resource usage, anomaly detector 656 configured to detect anomalies, resource allocator 658 configured to allocate resources, resource usage monitor 660 configured to monitor resource usage, prediction assessor 662 configured to compare an actual resource usage to a predicted resource usage, and reinforcement learning module 664 configured to perform reinforcement learning. Each of information collector 652, machine-learning based resource predictor 654, anomaly detector 656, resource allocator 658, resource usage monitor 660, prediction assessor 662, and reinforcement learning module 664 is a set of processor executable instructions stored at a processor readable memory, e.g. the memory resources of the cluster controller machine 651, and configured to be executed by a processor, e.g. of the compute resources of the cluster controller machine 651.

Figure 7:
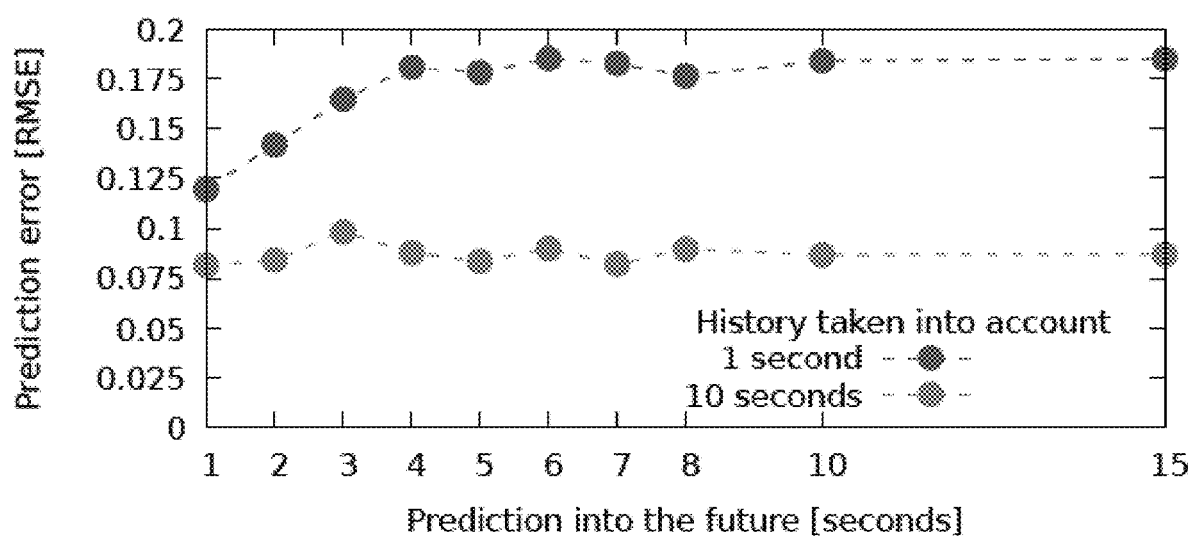
FIG. 7 depicts the results of a preliminary test of a system according to an embodiment of the invention.

FIG. 7 depicts the results of a preliminary test of a system according to an embodiment of the invention. System calls from various applications were collected to create a system call corpus. Resource usage and system calls of a scientific computing toolchain that executed a number of bash and python scripts, which interleaved I/O- and CPU-heavy phases were then collected. Finally, the system calls were embedded and an LSTM was trained with the data. The model was trained to minimize the RMSE of the CPU usage (as a value between 0 and 1) i seconds into the future. The results are shown, varying both how far to predict into the future, and how much history to take into account for the prediction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for monitoring resources in a computing system having system information, the method comprising:
   transforming variable-size information into fixed-size information;
   creating a machine learning model and training the machine learning model to predict future resource usage of an application; and
   providing the prediction of further resources usage of the application as an input to an action component, wherein the action component is one of an anomaly detector or a reinforcement learner that drives a scheduler; and
   performing, by the action component, at least one of scheduling resources within the computing system or detecting a resources usage anomaly,
   wherein the system information includes resource usage statistics of one or more resources in the computing system and further includes raw system call data,
   wherein the raw system call data includes a sequence of system calls and, for each respective system call in the sequence, a time stamp indicting a time at which the respective system call was made, and
   wherein the sequence of system calls is divided into a plurality of time interval system call sequences, each time interval system call sequence including system calls corresponding to a particular time interval.

2. The method according to claim 1, wherein the system information includes at least one of CPU usage, memory usage, and system calls.

3. The method according to claim 1, wherein transforming variable-size information into fixed-size information comprises transforming each time interval system call sequence into a fixed-dimension vector representation.

4. The method according to claim 3, wherein at least one of a one-hot encoding or a count hot encoding is used to transform each of the plurality of time interval system call sequence into a fixed-dimension vector representation.

5. The method according to claim 3, wherein representation learning is used to transform each of the plurality of time interval system call sequence into a fixed-dimension vector representation.

6. The method according to claim 3, wherein training the machine learning model to predict future resource usage of the application comprises providing the fixed-dimension vector representations to the machine learning model as an input.

7. The method according to claim 6, wherein training the machine learning model to predict future resource usage of the application further comprises providing, for each particular time interval, a resource usage vector including a number of dimensions corresponding to a number of metrics in the resource usage statistics of the one or more resources in the computing system.

8. The method according to claim 7, wherein elements of each resource usage vector include numerical values corresponding to measured values of the metrics in the resources usage statistics.

9. The method according to claim 1, wherein the particular time interval corresponds to a time interval at which the resource usage statistics of the one or more resources in the computing system are measured.

10. The method according to claim 1, wherein the machine learning model is a neural network model.

11. A system for monitoring resources in a computing system having system information, the system comprising:
    memory resources configured to store data; and
    compute resources including one or more processors configured to:
      transform variable-size information into fixed-size information;
      create a machine learning model and train the machine learning model to predict future resource usage of an application, and
      provide the prediction of further resources usage of the application as an input to an action component, wherein the action component is one of an anomaly detector or a reinforcement learner that drives a scheduler; and
      perform at least one of scheduling resources within the computing system or detecting a resource usage anomaly,
    wherein the system information includes resource usage statistics of one or more resources in the computing system and further includes raw system call data,
    wherein the raw system call data includes a sequence of system calls and, for each respective system call in the sequence, a time stamp indicting a time at which the respective system call was made, and
    wherein the sequence of system calls is divided into a plurality of time interval system call sequences, each time interval system call sequence including system calls corresponding to a particular time interval.

12. A non-transitory computer readable medium having stored thereon computer executable instructions for performing a method for monitoring resources in a computing system having system information, the method comprising:
    transforming variable-size information into fixed-size information;
    creating a machine learning model and training the machine learning model to predict future resource usage of an application; and
    providing the prediction of further resources usage of the application as an input to an action component, wherein the action component is one of an anomaly detector or a reinforcement learner that drives a scheduler; and
    performing, by the action component, at least one of scheduling resources within the computing system or detecting a resource usage anomaly,
    wherein the system information includes resource usage statistics of one or more resources in the computing system and further includes raw system call data,
    wherein the raw system call data includes a sequence of system calls and, for each respective system call in the sequence, a time stamp indicting a time at which the respective system call was made, and
    wherein the sequence of system calls is divided into a plurality of time interval system call sequences, each time interval system call sequence including system calls corresponding to a particular time interval.

* * * * *